Jan. 28, 1964  R. E. SCHORNSTHEIMER ETAL  3,119,158
MAGNETIC GASKET
Filed Feb. 20, 1958
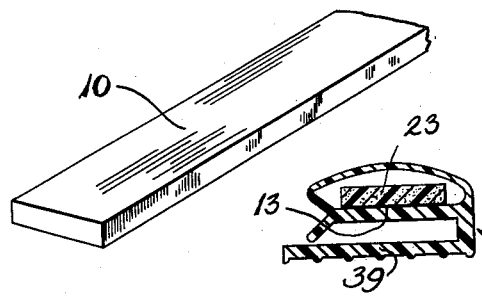
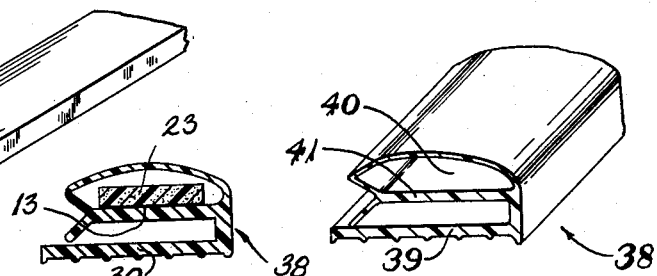
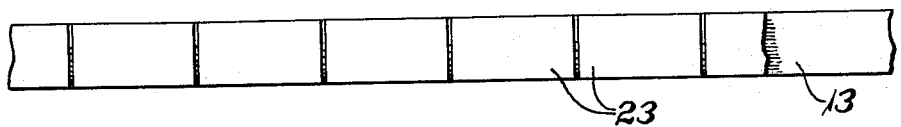
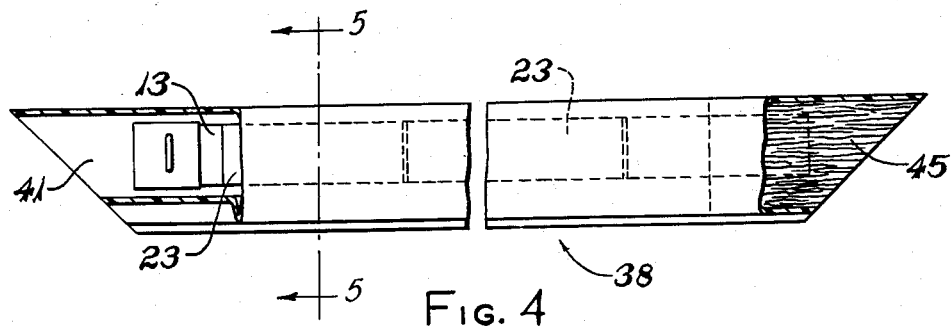
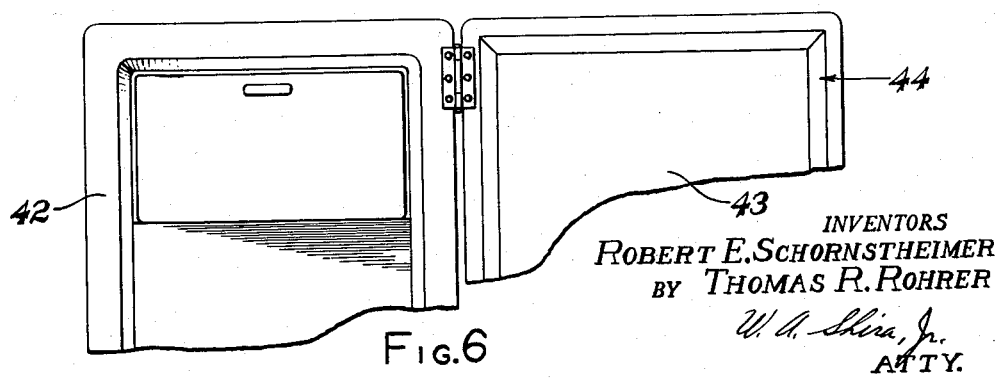
INVENTORS
ROBERT E. SCHORNSTHEIMER
BY THOMAS R. ROHRER
ATTY.

United States Patent Office 3,119,158
Patented Jan. 28, 1964

3,119,158
MAGNETIC GASKET
Robert E. Schornstheimer, Marietta, and Thomas R. Rohrer, Marion, Ohio, assignors to The B. F. Goodrich Company, New York, N.Y., a corporation of New York
Filed Feb. 20, 1958, Ser. No. 716,482
4 Claims. (Cl. 20—69)

This invention relates to an improved flexible gasket containing permanent magnets. The improved method of making such gaskets is disclosed and claimed in our copending divisional application Serial No. 209,908, filed July 16, 1962.

Refrigerators, especially those of the type used in the home, employ a gasket or sealing means between the door and the body of the cabinet to cushion the door in closing, prevent the passage of air when the door is closed and provide a heat insulating barrier in this region. These gaskets are generally formed of rubber, synthetic plastic material, or other elastomeric material which have rubber-like properties so they can deform under pressure and thereby provide a seal between the cabinet and door even though there be irregularities in the surfaces of these members. Heretofore, it has been customary to form the gasket of a material and in configuration such that considerable pressure is required to deform the gasket sufficiently to provide efficient sealing action around the entire door opening. This has made it necessary to utilize door latches which produce a strong clamping force. In an effort to avoid the need for such latches, attempts have been made to employ door gaskets requiring only a light compressive force to effect confirmation to the surfaces engaged, this force being supplied by magnetic means. Although such magnetic door gaskets have many advantages over the conventional combination of latch and stiff gasket, nevertheless, they have not received wide acceptance. This is partly because the gaskets, in some cases, have not provided the necessary sealing action but, more importantly, because the cost of manufacture has been excessive.

The principal object of this invention is, therefore, to produce an improved gasket of resilient material provided with permanent magnets which has better sealing action and may be produced at lower cost than prior magnetic gaskets.

Another object of the invention is to provide an improved magnet-containing gasket of a construction such that the production and insertion of the magnets in the gasket are more rapidly and less expensively effected than heretofore, and flexibility of the gasket is achieved as the result of employing, in a hollow chamber of the gasket, magnets in the form of closely adjacent blocks of resin bonded finely divided particles of magnet-forming material.

The invention further resides in certain novel structural features of the gasket, and further objects and advantages of the invention will be apparent to those skilled in the art to which the invention pertains from the following description of the presently preferred embodiment described with reference to the drawings forming a part of this application, and in which:

FIG. 1 is a perspective view of a portion of a strip of magnet-forming material employed in practicing the invention;

FIG. 2 is a plan view of a portion of the magnetic material divided into blocks and supported on a flexible tape;

FIG. 3 is a fragmentary perspective view of a resilient gasket of flexible material which may be provided with magnetic means of the type illustrated in FIG. 2, the near end of the view being in transverse section;

FIG. 4 is a fragmentary plan view of a portion of a gasket of the type shown in FIG. 3 provided with a magnetic means of the type shown in FIG. 2 with parts of the gasket being broken away to further illustrate the nature of the completed gasket strip;

FIG. 5 is a transverse sectional view through the gasket illustrated in FIG. 4, the view being taken on the section indicating line 5—5; and FIG. 6 is a fragmentary front elevational view of a domestic refrigerator with the open door thereof provided with a gasket constructed in accordance with the invention.

Efficient sealing action between the cabinet and door of the refrigerator requires that the gasket assembly have a high order of flexibility so that it can accommodate to irregularities on the cooperating surfaces of the cabinet and door. Hence, the material and the configuration thereof employed for the gasket must be such that the latter is flexible and easily resiliently deformed. When the gasket contains magnets, they should be so arranged that the magnetic attraction is substantially uniform at all locations along the gaskets and this must be achieved without excessive loss of flexibility of the assembly. These requirements make it imperative that there be a large number of small closely adjacent magnets within the gasket. The production of such a magnet-containing gasket has been difficult to achieve by known procedures.

In accordance with this invention, the magnets employed in the gasket are formed from finely-divided magnet-forming material united by a binder and shaped into an elongated strip which is then divided into discrete blocks. Preferably, the magnet-forming material is a ferrite and the binder is a synthetic resin. The particular ferrite and resin employed, as well as the percentages thereof, can, of course, be varied but the presently preferred composition, in terms of the weights of the components, is one comprising 90% ferrite and 10% vinyl resin. The resin may include a plasticizer in sufficient quantity to facilitate handling of the mixture as hereinafter explained.

The magnet-forming material and binder are thoroughly mixed and subjected to sufficient heat and pressure to form an elongated strip 10, as illustrated in FIG. 1. This can be effected by providing the ferrite and resin in powder form which are mixed, milled, granulated and then extruded by conventional machinery of the type employed for fabricating synthetic resins. Apparatus of this type is well-known and, hence, need not be illustrated. As here shown, the strip 10 is rectangular in cross section with a width of approximately ½ inch and a thickness of approximately ⅛ inch. These dimensions are not critical, however, and the cross-sectional shape and dimensions are selected in accordance with the desired dimensions of the completed gasket.

The strip 10 may be led from the extruder or other apparatus in which is is formed directly through the subsequent operations which incorporate it as a part of a complete gasket, or the strip may be produced and subsequently incorporated into a gasket in two or more separate operations. The strip 10, when cooled after forming, has sufficient transverse flexibility that it can be coiled on a drum or reel without breaking provided the diameter thereof is large enough so that the strip is not subjected to small radius bending. However, the strip is sufficiently fragile so that it can be readily broken by notching or scoring and then bending it in an arc of small radius.

The strip 10 is converted into a plurality of small magnets and prepared for incorporation into a resilient gasket by a sequence of operations as disclosed in detail and claimed in our aforementioned copending application Serial No. 209,908. It is sufficient here to note that the strip 10 of magnet-forming material is adhered to a supporting strip 13 of flexible material which may be one of the commercially available pressure adhesive tapes. After the strip 10 is so supported, it is divided into discrete blocks 23 without injury to the supporting strip 13, the division being in a manner such that the blocks are spaced slightly. The composite strip comprising the flexible tape 13 and the blocks 23 supported thereon is sufficiently transversely flexible to permit it to readily conform to irregular surfaces when employed in a resilient gasket as hereinafter explained.

The composite strip with the magnet-forming material in the form of discrete blocks or units 23 is next passed through a magnetic field to magnetize the blocks so that these become permanent magnets. The configuration of the magnetic field imparted to the blocks may be selected in accordance with the nature and degree of holding power required for the magnets. Thus, they may be magnetized with the adjacent ends of the separate blocks of either like or unlike polarity, or they may have opposite poles along the longitudinal edges, or each block or unit may have several sets of magnetic poles. The desired arrangement of the magnet poles can be effected by employing an electrically energized magnetizing unit of known construction.

The gasket in which the magnets are employed may be formed of rubber, vinyl, or other elastomeric material in a variety of different configurations. One suitable type, designated 38, is shown in FIGS. 3, 4 and 5 as comprising a base or attachment flange portion 39 and an integral longitudinally extending tubular portion or cushion 40 which provides a chamber that is approximately crescent shape in cross section and is sufficiently thin walled to readily deform under light pressure. The dimensions of the chamber in the cushion portion 40 of the gasket are such that the composite strip is accommodated therein with a space between the tops of the magnetic blocks and the outer wall of the gasket.

The insertion of a length of the composite strip material into the tubular or cushion portion 40 of the gasket may be effected by a variety of different procedures. For example, the gasket may be held substantially vertically and the composite strip dropped therein. Alternatively, the gasket may be placed in a substantially horizontal position and the composite strip pulled therethrough by a suitable member of cross sectional dimension less than that of the tubular portion 40 of the gasket. In either case, the operation is facilitated by the presence of the backing or supporting strip 13 which allows a plurality of discrete blocks 23 of magnetic material to be handled as a single unit.

After the composite strip has been inserted within the hollow chamber of the gasket, it is secured therein to the lower or base wall 41 of the chamber in the tubular portion 40 by any suitable expedient. As here shown, the strip is thus secured by allowing the supporting strip 13 to extend slightly beyond the end magnetic blocks 23 and stapling this extending portion to the wall 41. In place of stapling, a suitable adhesive or other means of fastening may be employed.

A plurality of lengths of resilient gasket material, supplied with the composite strips including the magnetic blocks, may be assembled into a complete gasket for refrigerators or other cabinet by uniting such strips into a rectangular or other configuration corresponding to that of the opening in the cabinet which is to be sealed. As shown in FIG. 6, the refrigerator cabinet 42 is provided with a door 43 to which is secured a rectangular gasket 44, each side of which is formed by one length of magnet-containing resilient gasket material of the type shown in FIGS. 4 and 5. The union of the separate lengths of the gasket into a rectangular configuration of this type is preferably effected by mitering the adjacent ends so that they can be heat sealed together in substantially right-angle relationship. The mitering and uniting operation is facilitated by first inserting into the ends of the tubular portion 40 of each separate length of the gasket a short length or plug 45 of heat insulating material such as glass wool. These plugs provide a support for the walls of the hollow portion of the gasket thus facilitating cutting and uniting of the end portions. In addition, the plugs 45 somewhat stiffen the corners of the gasket thus preventing undesirable deformations thereof when attached to the door 43.

The refrigerator 42 or other cabinet provided with a magnet-containing gasket such as 44 does not require a latch to hold the door in closed position. This follows from the fact that the cabinets of refrigerators are conventionally made of steel and, hence, when the door with the gasket 44 is moved to a position in which the door substantially closes the opening to the cabinet, the magnetic attraction between the magnetic blocks 23 and the material of the cabinet 42 causes the door to be completely closed. Moreover, an effective seal is provided between the door and cabinet since the gasket is compressed or deformed by the attempts of the magnetic blocks to move into intimate contact with the cabinet 42. The flexible nature of the gasket material and the fact that the magnetic material is in the form of short discrete blocks permits the basket to conform with surface irregularities of the cabinet and the door thus making an effective seal without the need of a strong clamping force. Moreover, the nature and construction of the magnet-containing gasket insures uniform sealing pressure throughout its entire extent in contrast to the forces exerted upon a conventional gasket when it is deformed by a door which is closed and secured by a single mechanical latch. Furthermore, the effective sealing action of the gasket is achieved with an increase of safety over that possible with mechanically operated latches since the door can be as easily opened from the interior as from the exterior.

The production of magnet-containing gaskets, in accordance with this invention, can be economically effected so that these gaskets can compete with conventional gaskets and latching means heretofore employed. Furthermore, the invention makes it unnecessary to provide a specially designed resilient gasket for receiving the magnets so that the best features of heretofore known gasket configurations can be employed.

The invention is susceptible of modifications and adaptations and is not limited to the embodiment set forth in the detailed description except as may be required by the spirit and scope of the appended claims.

Having thus described the invention, we claim:

1. An article of manufacture comprising an elongated gasket of flexible material adapted to be used between a member having an opening and a closure member for that opening, the said gasket including wall portions defining a hollow chamber extending lengthwise of the gasket, an attaching portion for mounting said gasket on one of said members with the bottom of said chamber adjacent that member and the top of the gasket positioned for engagement by the other of said members, and permanent magnet means in said hollow chamber extending substantially the entire length of said chamber in contact with and secured to the bottom of the latter, the thickness of said magnet means being less than the height of said chamber thereby providing a space between the entire top of said magnet means and to the top of said gasket permitting deformation of the top of said gasket when engaged by the said other of the members, the said magnet means comprising a magnetic material in finely-divided form united by a synthetic resin such that the said magnet means is transversely flexible.

2. An elongated flexible gasket adapted to be used for sealing a hinged door member adjacent its edges against a casing having an opening closable by said door member, the said gasket comprising a longitudinally extending portion for mounting on one of said members in surrounding relationship to said opening, a plurality of spaced walls integrally united to each other and to said attaching portion defining an elongated hollow chamber in superposed relationship to said attaching portion with the inner wall of said chamber adapted to be closely adjacent the member on which the gasket is mounted and the outer wall of said chamber spaced from the inner wall for engagement by the other of said members, permanent magnet means comprising a finely-divided ferrite united by a flexible binder within said chamber in contact with and secured to the said inner wall of the chamber, the thickness of said magnet means throughout its length being less than the distance between the said inner and outer walls of the gasket with the outer surface of said magnet means being substantially planar and spaced throughout its entire extent from the said outer wall of the chamber when the latter is not deformed by pressure thereon, whereby the said outer wall of the chamber is deformed into sealing relationship with the said other member when engaged thereby.

3. A gasket as defined in claim 2 wherein said magnet means comprises a plurality of substantially rectangular discrete permanent magnets adhered to an elongated flexible tape which is in turn in contact with and secured to the said inner wall of the gasket.

4. An article of manufacture comprising an elongated gasket of flexible material adapted to be used between a member having an opening and a closure member for that opening, the said gasket including wall portions defining a hollow chamber extending lengthwise of the gasket, an attaching portion for mounting said gasket on one of said members with the bottom of said chamber adjacent that member and the top of the gasket positioned for engagement by the other of said members, permanent magnet means in said hollow chamber extending substantially the entire length of the latter, the said magnet means comprising adjacent discrete blocks of a ferrite in finely-divided form united by a vinyl resin with the thickness of the blocks being less than the height of said chamber, a strip of flexible material adhered to said blocks, and means securing the said strip to and in contact with the bottom of said chamber with the entire top surface of said magnet means spaced from the top of said chamber thereby providing a space between the top of said magnet means and the top of said gasket permitting deformation of the top of the gasket when engaged by the said other of the members.

References Cited in the file of this patent
UNITED STATES PATENTS

| | | |
|---|---|---|
| 2,389,298 | Ellis | Nov. 20, 1945 |
| 2,508,128 | Waards | May 16, 1950 |
| 2,589,766 | Bernstein | Mar. 18, 1952 |
| 2,619,693 | Harle | Dec. 2, 1952 |
| 2,627,097 | Ellis | Feb. 3, 1953 |
| 2,659,114 | Anderson et al. | Nov. 17, 1953 |
| 2,659,116 | Korb | Nov. 17, 1953 |
| 2,659,118 | Anderson et al. | Nov. 17, 1953 |
| 2,807,841 | Janos | Oct. 1, 1957 |
| 2,820,734 | Rueckert | Jan. 21, 1958 |